(12) United States Patent
Goutzoulis et al.

(10) Patent No.: US 7,416,352 B2
(45) Date of Patent: Aug. 26, 2008

(54) OPTICAL MULTI-CHANNEL FREE SPACE INTERCONNECT

(75) Inventors: Akis Goutzoulis, Annapolis, MD (US); John B. Goodell, Baltimore, MD (US); Gervase J. Willis, Orrtanna, PA (US)

(73) Assignee: Northrop Grumman Corporation, Los Angeles, CA (US)

( * ) Notice: Subject to any disclaimer, the term of this patent is extended or adjusted under 35 U.S.C. 154(b) by 435 days.

(21) Appl. No.: 11/220,651

(22) Filed: Sep. 8, 2005

(65) Prior Publication Data

US 2007/0053694 A1   Mar. 8, 2007

(51) Int. Cl.
G02B 6/36 (2006.01)
H04B 10/00 (2006.01)

(52) U.S. Cl. ............................. 385/89; 385/31; 385/88; 385/24; 385/36; 398/130

(58) Field of Classification Search .................. 385/31, 385/36, 39, 18, 24, 47, 48, 11, 34, 35, 88, 385/89, 92, 129, 130; 398/86, 82, 118, 130, 398/85, 88

See application file for complete search history.

(56) References Cited

U.S. PATENT DOCUMENTS

| | | | | |
|---|---|---|---|---|
| 5,182,780 A | 1/1993 | Robertson | | 385/14 |
| 5,266,794 A | 11/1993 | Olbright et al. | | 250/214 |
| 5,311,345 A | 5/1994 | Cloonan et al. | | 359/139 |
| 5,524,219 A | 6/1996 | Li | | 395/310 |
| 5,546,209 A | 8/1996 | Willner et al. | | 359/115 |
| 5,574,814 A | 11/1996 | Noddings et al. | | 385/90 |
| 5,661,584 A | 8/1997 | Redmond et al. | | 359/175 |
| 5,726,786 A | 3/1998 | Heflinger | | 359/152 |
| 5,798,580 A | 8/1998 | Morozov et al. | | 307/112 |
| 5,822,096 A | 10/1998 | Redmond et al. | | 359/129 |
| 5,920,664 A | 7/1999 | Hirabayashi et al. | | 385/16 |
| 5,923,796 A | 7/1999 | Feldman et al. | | 385/14 |
| 5,943,150 A | 8/1999 | Deri et al. | | 359/133 |
| 6,137,930 A | 10/2000 | Laughlin | | 385/34 |
| 6,253,007 B1 | 6/2001 | Laughlin | | 385/34 |
| 6,339,503 B1 | 1/2002 | Derstine et al. | | 359/622 |
| 6,410,941 B1 | 6/2002 | Taylor et al. | | 257/84 |
| 6,417,947 B1 | 7/2002 | Durant et al. | | 359/155 |
| 6,539,138 B2 | 3/2003 | Holmes | | 385/16 |
| 6,574,398 B2 | 6/2003 | Coldren et al. | | 385/49 |
| 6,594,050 B2 | 7/2003 | Jannson et al. | | 359/139 |
| 6,606,427 B1 | 8/2003 | Graves et al. | | 385/17 |
| 6,650,844 B1 | 11/2003 | Davies et al. | | 398/164 |
| 6,661,940 B2 | 12/2003 | Kim | | 385/15 |
| 6,661,943 B2 | 12/2003 | Li | | 385/18 |
| 6,680,797 B2 | 1/2004 | Juday | | 359/484 |
| 6,694,073 B2 * | 2/2004 | Golub et al. | | 385/18 |
| 6,718,084 B1 | 4/2004 | Wang | | 385/17 |
| 6,751,379 B2 * | 6/2004 | Capewell et al. | | 385/36 |
| 6,763,195 B1 | 7/2004 | Willebrand et al. | | 398/115 |
| 6,775,480 B1 | 8/2004 | Goodwill | | 398/158 |
| 6,788,873 B2 | 9/2004 | Fritz et al. | | 385/138 |
| 6,788,898 B1 | 9/2004 | Britz et al. | | 398/70 |
| 6,795,655 B1 | 9/2004 | Sidorovich et al. | | 398/128 |

(Continued)

*Primary Examiner*—Brian M Healy
(74) *Attorney, Agent, or Firm*—Rothwell, Figg, Ernst & Manbeck

(57) ABSTRACT

Various embodiments of the present invention provide optical multi-channel free space interconnects that provide optical channel isolation, thereby reducing crosstalk.

29 Claims, 2 Drawing Sheets

U.S. PATENT DOCUMENTS

| | | | |
|---|---|---|---|
| 6,941,047 B2 * | 9/2005 | Capewell et al. | 385/47 |
| 2001/0035995 A1 | 11/2001 | Ruggiero | 128/898 |
| 2002/0071160 A1 | 6/2002 | Pavelchek | 359/152 |
| 2003/0210870 A1 | 11/2003 | Graves | 385/71 |
| 2003/0228087 A1 | 12/2003 | Spivey et al. | 385/16 |
| 2004/0126050 A1 | 7/2004 | Claydon et al. | 385/14 |
| 2004/0208597 A1 * | 10/2004 | Wittenberger et al. | 398/130 |
| 2004/0208598 A1 * | 10/2004 | Wittenberger et al. | 398/130 |
| 2007/0053694 A1 * | 3/2007 | Goutzoulis et al. | 398/130 |

* cited by examiner

OPTICAL MULTI-CHANNEL FREE SPACE INTERCONNECT

This invention was made with Government support under contract no. DAAH01-98-C-R150 awarded by DARPA and administered by the U.S. Army Aviation and Missile Command. The Government has certain rights in this invention.

BACKGROUND OF THE INVENTION

1. Field of the invention

The present invention relates to optical interconnects.

2. Discussion of the Background

The coupling of optical signals between components (e.g., circuit boards or other components) is an area of growing interest. Metal interconnections (e.g., metal backplanes) appear to have reached their speed limits, and therefore, optical backplanes and optical interconnect schemes are being considered as the next generation board-to-board interconnect solution. Single channel optical connections have been used for years, but the limit of pulse coded modulation (PCM) through a single optical channel is also reaching a practical limit.

To solve this problem, multiple parallel optical "paths" or "channels" are used. By paralleling paths, one can achieve higher data rates. The greater the number of paths the greater the overall throughput. In some applications, arrays of low cost lasers (e.g., a vertical cavity surface emitting laser (VCSEL)) are used for transmitting the optical signals and low cost photodiode arrays (e.g., GaAs photodiodes) are used for detecting the optical signals.

Problems exist when one is trying to interface the transmitting and detecting arrays. For example, the lasers used for transmission may emit light of 0.85 micrometers wavelength into a twenty-degree cone. The large cone angle creates crosstalk problems when attempting to couple each individual laser to an individual detector. Further, the lasers are usually situated on a recessed horizontal surface, thus emitting light into cones with vertical axes. This arrangement creates logistic problems because the light must be moved up (from a typical board) about an inch and a half followed by about two inches horizontally to an adjacent board, then down an inch and a half to the upward looking detectors.

What is desired is an optical multi-channel interconnect that provides maximum optical isolation of adjacent channels (i.e., minimum crosstalk) while also providing minimal optical signal power loss.

SUMMARY OF THE INVENTION

Various embodiments of the present invention provide optical multi-channel free space interconnects that provide a significant degree of optical channel isolation, thereby reducing crosstalk.

An optical multi-channel free space interconnect according to one particular embodiment of the present invention includes: a first transparent block of material positioned in front of a transmitter array and having a first side and a second side perpendicular with the first side, wherein light transmitted from each transmitter of the transmitter array enters through the first side and exits through the second side; a second transparent block of material positioned in front of the transmitter array and between the transmitter array and the first side of the first block so that the light transmitted from each transmitter of the array passes through the second block before entering the first block; a coupling lens positioned adjacent the second side of the first block such that the light exiting the second side passes through the coupling lens; and a collimator positioned adjacent the coupling lens, the coupling lens being positioned between the first block and the collimator, wherein the light passing through the coupling lens also pass though the collimator.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention.

DETAILED DESCRIPTION OF PREFERRED EMBODIMENTS

A free space interconnect is defined as a non-electrical and non-fiber-optic interconnect for coupling an optical transmitter (e.g., a laser or other optical transmitter) with an optical detector (e.g., a photodiode or other optical detector).

Figure 1:
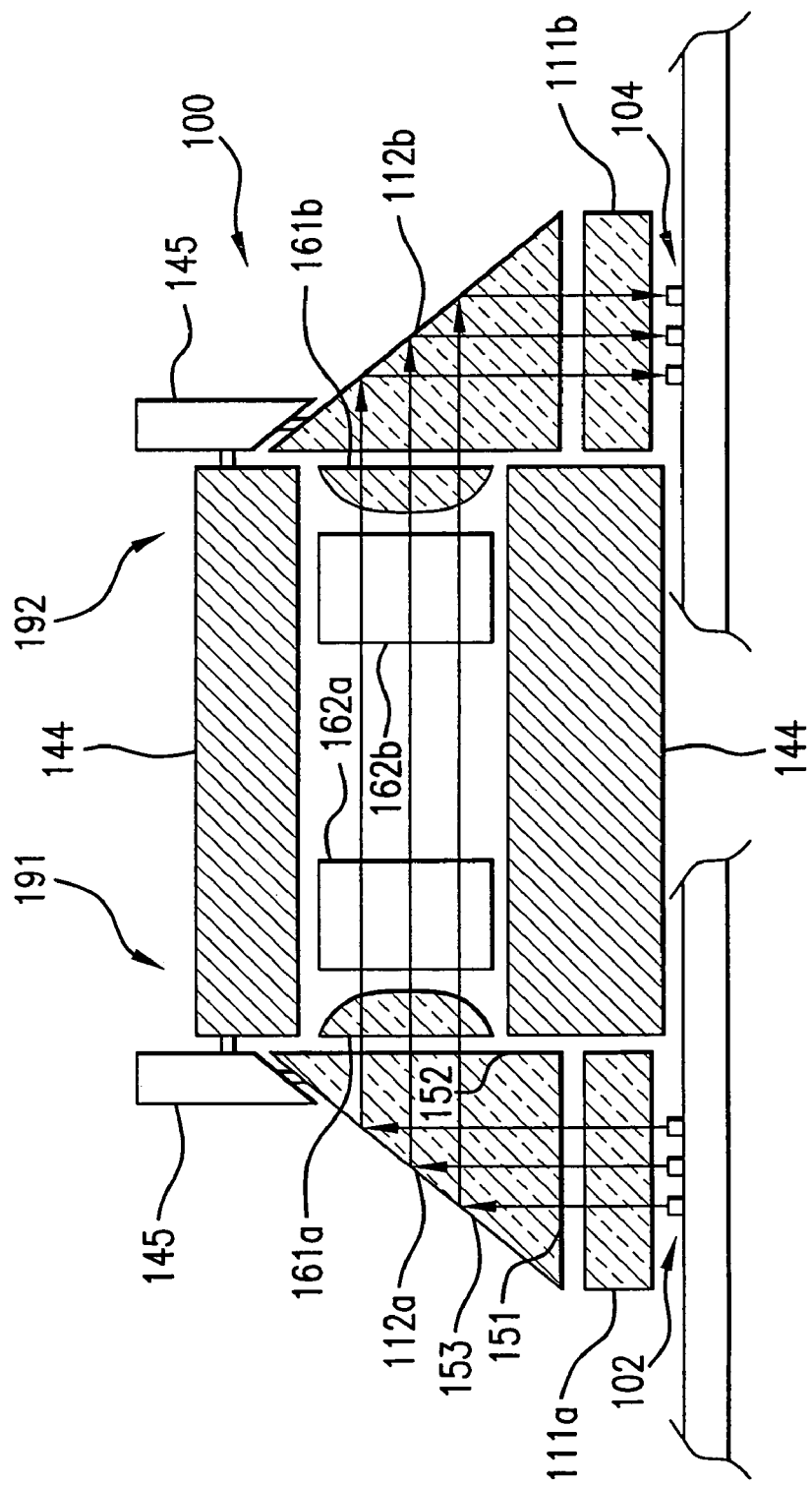
FIG. 1 is a schematic of an optical, multi-channel, free-space interconnect 100, according to one particular embodiment.

Referring now to FIG. 1, FIG. 1 is a schematic of an optical, multi-channel, free-space interconnect 100, according to one particular embodiment of the invention, for providing a transmission path between an array of transmitters 102 (e.g., 400 or more transmitters) and an array detectors 104 (e.g., 400 or more detectors). In some embodiments, each transmitter is a laser (e.g., VCSE lasers) and each detector is a photodiode.

As shown in FIG. 1, interconnect 100 uses air and bulk optics to conduit optical signals from the transmitter array to the detector array. More specifically, in the embodiment shown in FIG. 1, interconnect 100 includes a transmitting half 191 and a receiving half 192.

In the embodiment shown, the transmitting half 191 of interconnect 100 includes a transparent block of material 111a and another transparent block of material 112a for folding the optical signal emitted from the transmitter array 102. Blocks 111a and 112a are both positioned in front of the transmitter array 102 so that the light transmitted from each transmitter of the array 102 passes through block 111a and into block 112a. In some embodiments, block of material 111a is a block of sapphire and block of material 112a is a block of glass (e.g., a prism or other block of glass capable of folding light). Preferably, as shown, block 111a is positioned between the transmitter array 102 and block 112a.

In one embodiment, as mentioned above, block 112a functions to fold the light transmitted from the transmitter array. Accordingly, in some embodiments, as shown, block 112a is implemented with a prism. Prism 112a includes a first side 151 and a second side 152 that is perpendicular to first side 151. Side 151 faces towards block 111a and is positioned adjacent thereto so that light passing through block 111a also passes through side 151, thereby entering prism 112a. Preferably, prism 112a is constructed such that, on entering the prism 112a, each light ray converges slightly less and proceeds to a third side 153 of prism 112a where the light rays reflect (total internal reflection) off of the third side and then proceed to exit prism through the second side 152. This is illustrated in FIG. 1.

As also illustrated in FIG. 1, a coupling lens 161a may be positioned adjacent side 152 of prism 112a such that the light rays exiting side 152 pass through lens 161a. In some embodiments, lens 161a is a plano-convex lens with the flat side of the lens 161a positioned adjacent side 152 and directly facing side 152. A collimator 162a may be positioned adjacent the convex side of lens 161a. Collimator 162a functions to collimate the light passing through lens-161a. Collimator 162a may include one or more lenses.

After the light rays pass through collimator 162a, the light rays travel through free space (e.g., air) until they reach the detector half 192 of interconnect 100.

As shown in FIG. 1, detector half 192 includes the same components as transmission half 191. That is detector half 192 includes a collimator 162b, a coupling lens 161b, a transparent block 111b, and another transparent block 112b.

The components of detector half 192 are configured such that the light rays leaving transmission half 191 first pass through collimator 162b, then pass through lens 161b, then through block 112b, then though block 111b. After passing through block 111b, the light reaches the detector array 104, which converts the optical signal into an electrical signal.

Like lens 161a, lens 161b may be a plano-convex lens, wherein the planar side of the lens faces and is adjacent to block 112b. Similarly, like block 112a, block 112b functions to fold the transmitted light rays and may be a prism. And, like block 111a, block 111b may be an optical flat made out of sapphire.

As illustrated in FIG. 1, a housing 144 may be employed to house elements 161a, 162a, 161b and 162b. Additionally, retainers or fasteners 145 may be employed to fasten blocks 112a and 112b to housing 144, respectively.

In one embodiment, each transmitter of transmitter array 102 is a VCSEL and the rays from the VCSELs pass through several thin layers or "windows" (e.g., block 111a) in front of the VCSEL. All these windows have plane surfaces so their optical effect is to shift, very slightly upwardly, the apparent location of the VCSELs. The windows are optical flats which shifts an image by an amount equal to $t*(n-1)/n$, where t is the thickness of the optical flat and n is its refractive index. In some embodiments, the thickness of the optical flats should not exceed about 0.010 inches.

Embodiments of the present invention account for the fact that the VCSELs are not classical Lambertian light sources sending light over 180 degree angle (a hemisphere), but rather are regularly spaced light sources emitting into 20 degree cones. The design discussed above exploits the fact that ray divergence decreases upon entering a higher refractive index medium. The (relatively) high refractive index of blocks 112a reduces the beam spread from the VCSELs by a factor equal to the refractive index of the block material. A refractive index equal to 1.6 reduces the beam spread by one third. The lens 161a acts as a field lens, that together with the high index of the block 112a material contains the total ray bundle spread, coming from all the VCSELS, to within a circle diameter of slightly more than two and a quarter millimeters at the output block 112b face. The VCSEL locations and beam angles, the optical location of the VCSELs relative to the lens, the prism length and refractive index all control the creation of spots on the detector array 104.

Figure 2:
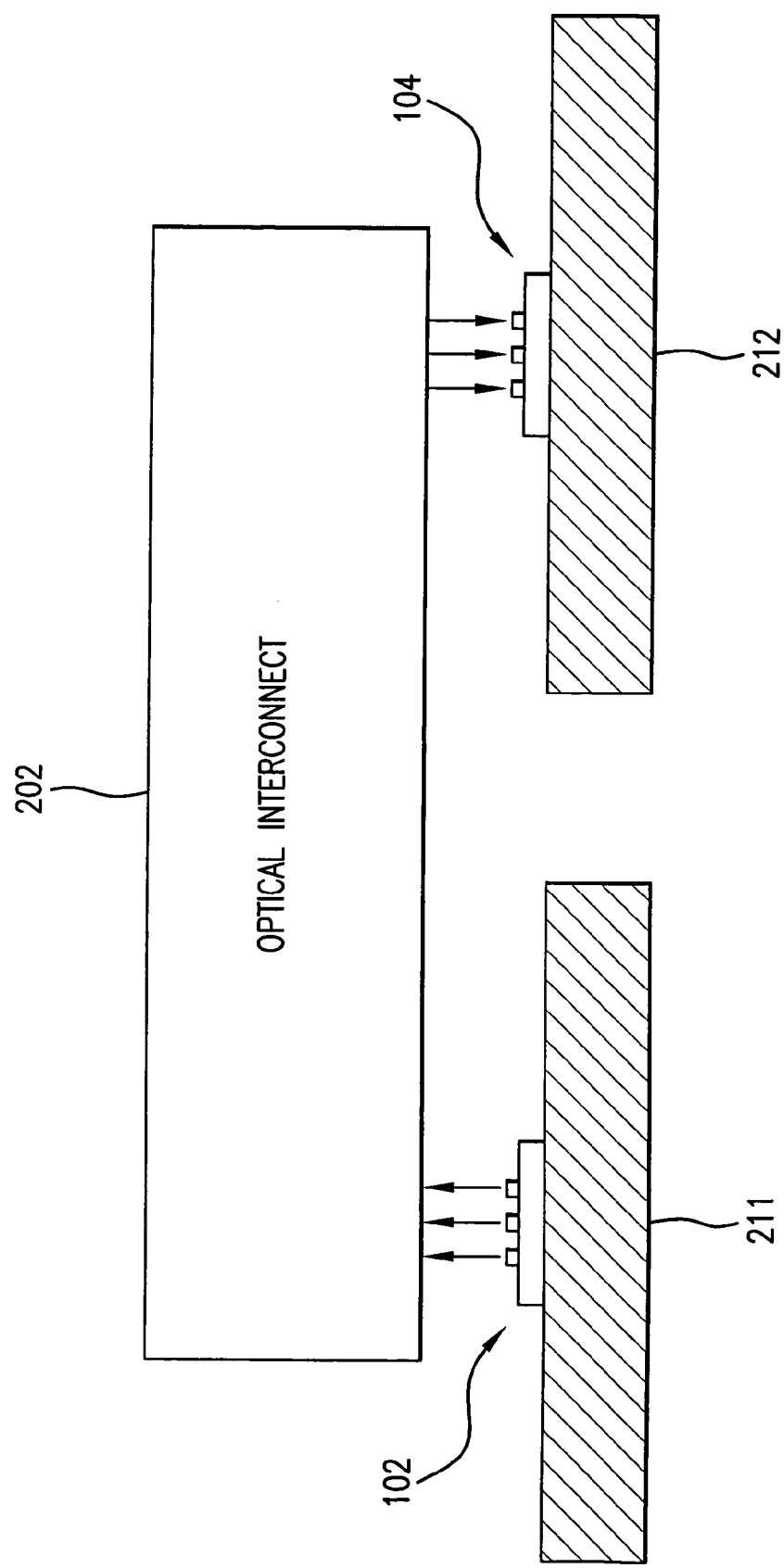
FIG. 2 illustrates a data processing system, according to one embodiment, that utilizes an optical multi-channel free space interconnect.

Referring now to FIG. 2, FIG. 2 illustrates a data processing system 200, according to one embodiment, that utilizes an optical multi-channel free space interconnect 202. Interconnect 202 may be implemented as shown in FIG. 1 and described above. Data processing system 200 includes transmitter array 102 connected to a first circuit board 211 and detector array 104 connected to a second circuit board 212. Interconnect 202 functions to couple the transmitter array 102 with the detector array 104 such that the light rays transmitted by array 102 are detected by array 104.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An optical, multi-channel, free space interconnect for coupling a transmitter array to a detector array, wherein the transmitter array includes a plurality of transmitters, each transmitting light, and the detector array includes a plurality of light detectors, comprising:
    a first transparent block of material positioned in front of the transmitter array and having a first side and a second side perpendicular with the first side, wherein the light transmitted from each transmitter of the transmitter array enters through the first side and exits through the second side;
    a second transparent block of material positioned in front of the transmitter array and between the transmitter array and the first side of the first block so that the light transmitted from each transmitter of the array passes through the second block before entering the first block;
    a coupling lens positioned adjacent the second side of the first block such that the light exiting the second side passes through the coupling lens; and
    a collimator positioned adjacent the coupling lens, the coupling lens being positioned between the first block and the collimator, wherein the light passing through the coupling lens also pass though the collimator.

2. The interconnect of claim 1, wherein the second block of material comprises a sapphire window.

3. The interconnect of claim 2, wherein the first block is a prism.

4. The interconnect of claim 3, wherein the prism is constructed such that, on entering the prism, the light from each transmitter converges slightly less and proceeds to a third side of the prism where the light reflects off of the third side and then proceed to exit the prism through the second side.

5. The interconnect of claim 1, wherein the coupling lens is a plano-convex lens having a planar side and a convex side opposite the planar side, wherein the planar side of the lens is positioned adjacent to and facing the second side of block.

6. The interconnect of claim 1, wherein the collimator includes one or more lenses.

7. The interconnect of claim 1, wherein after the light passes through collimator, the light travels through free space until reaching a detector portion of the interconnect.

8. The interconnect of claim 7, wherein the detector portion of the interconnect comprises:
    a third transparent block of material positioned in front of the detector array and having a first side and a second side perpendicular with the first side, wherein the light transmitted from the transmitter array enters through the first side and exits through the second side;
    a fourth transparent block of material positioned in front of the detector array and between the detector array and the second side of the third block so that the light transmitted from each transmitter of the array passes through the third block before entering the fourth block;

a second coupling lens positioned adjacent the first side of the third block such that the light transmitted from the transmitter array pass through the coupling lens before entering the third block; and a second collimator positioned adjacent the second coupling lens, the second coupling lens being positioned between the third block and the second collimator such that the light passing through the second coupling lens first passes though the collimator.

9. The interconnect of claim 8, wherein the fourth block of material comprises a sapphire window.

10. The interconnect of claim 9, wherein the third block is a prism.

11. The interconnect of claim 10, wherein the prism is constructed such that, on entering the prism, the light from each transmitter converges slightly less and proceeds to a third side of the prism where the light reflects off of the third side and then proceeds to exit the prism through the second side.

12. The interconnect of claim 8, wherein the second coupling lens is a plano-convex lens having a planar side and a convex side opposite the planar side, and wherein the planar side of the lens is positioned adjacent to and facing the first side of the third block.

13. The interconnect of claim 8, wherein the second collimator includes one or more lenses.

14. The interconnect of claim 8, further comprising a housing for housing the second coupling lens and the second collimator.

15. The interconnect of claim 14, wherein the housing also houses the first coupling lens and the first collimator.

16. The interconnect of claim 14, wherein the first and third transparent blocks are each fastened to the housing.

17. A data processing apparatus, comprising:
a first circuit board having a transmitter array connected thereto, wherein the transmitter array includes a plurality of transmitters, each transmitting a light ray;
a second circuit board having a detector array connected thereto, wherein the detector array includes a plurality of detectors, each detector for detecting one of the light rays; and
an optical, multi-channel, free space interconnect as recited in claim 1 for coupling the transmitter array to the detector array.

18. An optical, multi-channel, free space interconnect for coupling a transmitter of light to a detector of light, comprising:
a transmitter portion; and
a detector portion, wherein
the transmitter portion consists essentially of:
a first transparent block of material positioned in front of the transmitter and having a first side and a second side perpendicular with the first side, wherein the light transmitted from the transmitter enters through the first side and exits through the second side;
a second transparent block of material positioned in front of the transmitter and between the transmitter and the first side of the first block so that the light transmitted the transmitter passes through the second block before entering the first block;
a coupling lens positioned adjacent the second side of the first block such that the light exiting the second side passes through the coupling lens; and a collimator positioned adjacent the coupling lens, the coupling lens being positioned between the first block and the collimator, wherein the light passing through the coupling lens also pass though the collimator, wherein the coupling lens is a plano-convex lens having a planar side and a convex side opposite the planar side, and wherein the planar side of the lens is positioned adjacent to and facing the second side of the first block.

19. The interconnect of claim 18, wherein the second block of material comprises a sapphire window.

20. The interconnect of claim 19, wherein the first block is a prism.

21. The interconnect of claim 20, wherein the prism is constructed such that, on entering the prism, the light from each transmitter converges slightly less and proceeds to a third side of the prism where the light reflects off of the third side and then proceed to exit the prism through the second side.

22. The interconnect of claim 18, wherein the collimator includes one or more lenses.

23. The interconnect of claim 18, wherein after the light passes through collimator, the light travels through free space until reaching a detector portion of the interconnect.

24. The interconnect of claim 23, wherein the detector portion of the interconnect comprises:
a third transparent block of material positioned in front of the detector array and having a first side and a second side perpendicular with the first side, wherein the light transmitted from the transmitter array enters through the first side and exits through the second side;
a fourth transparent block of material positioned in front of the detector array and between the detector array and the second side of the third block so that the light transmitted from each transmitter of the array passes through the third block before entering the fourth block;
a second coupling lens positioned adjacent the first side of the third block such that the light transmitted from the transmitter array pass through the coupling lens before entering the third block; and
a second collimator positioned adjacent the second coupling lens, the second coupling lens being positioned between the third block and the second collimator such that the light passing through the second coupling lens first passes though the collimator.

25. The interconnect of claim 24, wherein the fourth block of material comprises a sapphire window.

26. The interconnect of claim 25, wherein the third block is a prism.

27. The interconnect of claim 26, wherein the prism is constructed such that, on entering the prism, the light from each transmitter converges slightly less and proceeds to a third side of the prism where the light reflects off of the third side and then proceeds to exit the prism through the second side.

28. The interconnect of claim 24, wherein the second coupling lens is a piano-convex lens having a planar side and a convex side opposite the planar side, and wherein the planar side of the lens is positioned adjacent to and facing the first side of the third block.

29. The interconnect of claim 24, wherein the second collimator includes one or more lenses.

* * * * *